UNITED STATES PATENT OFFICE.

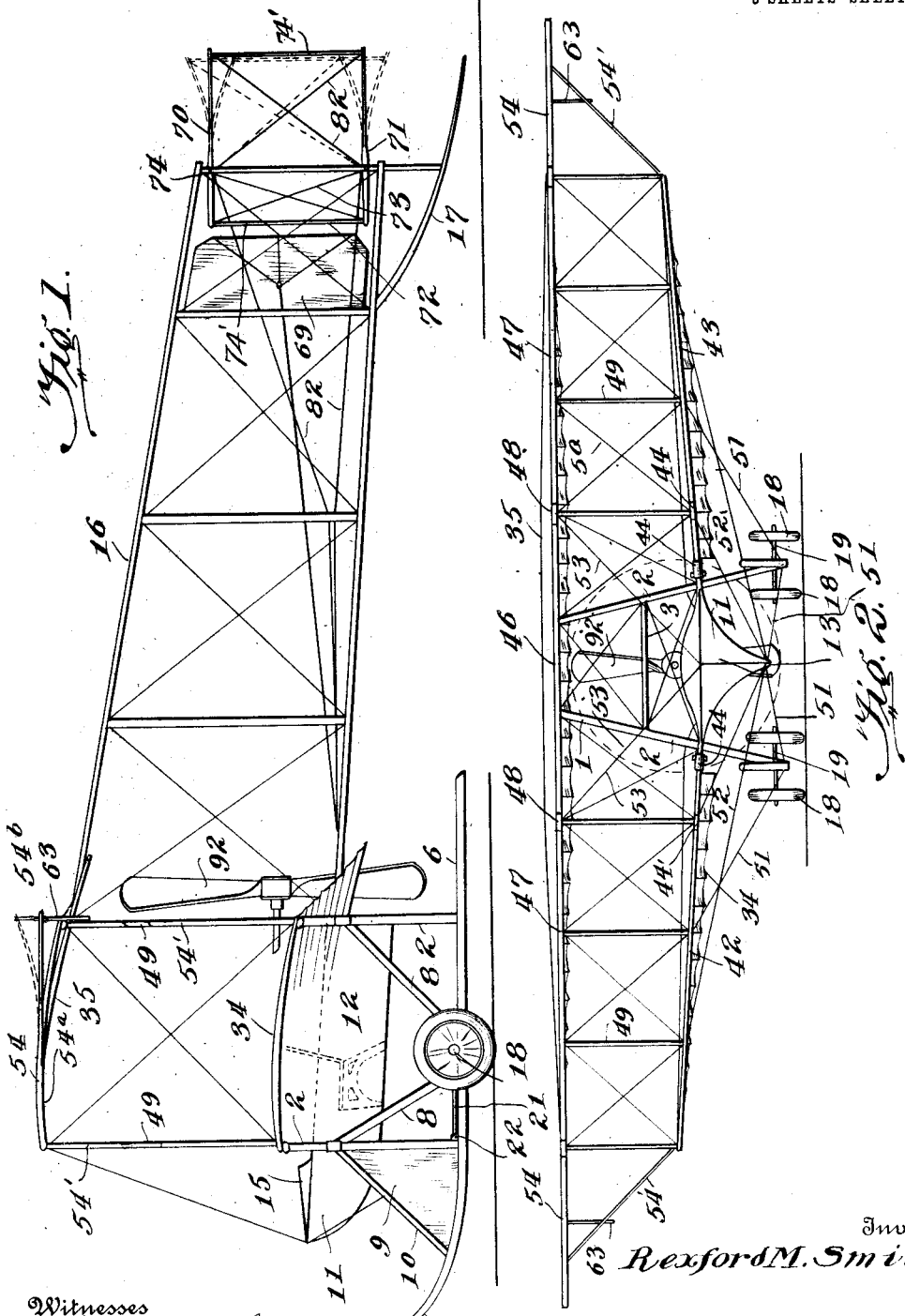

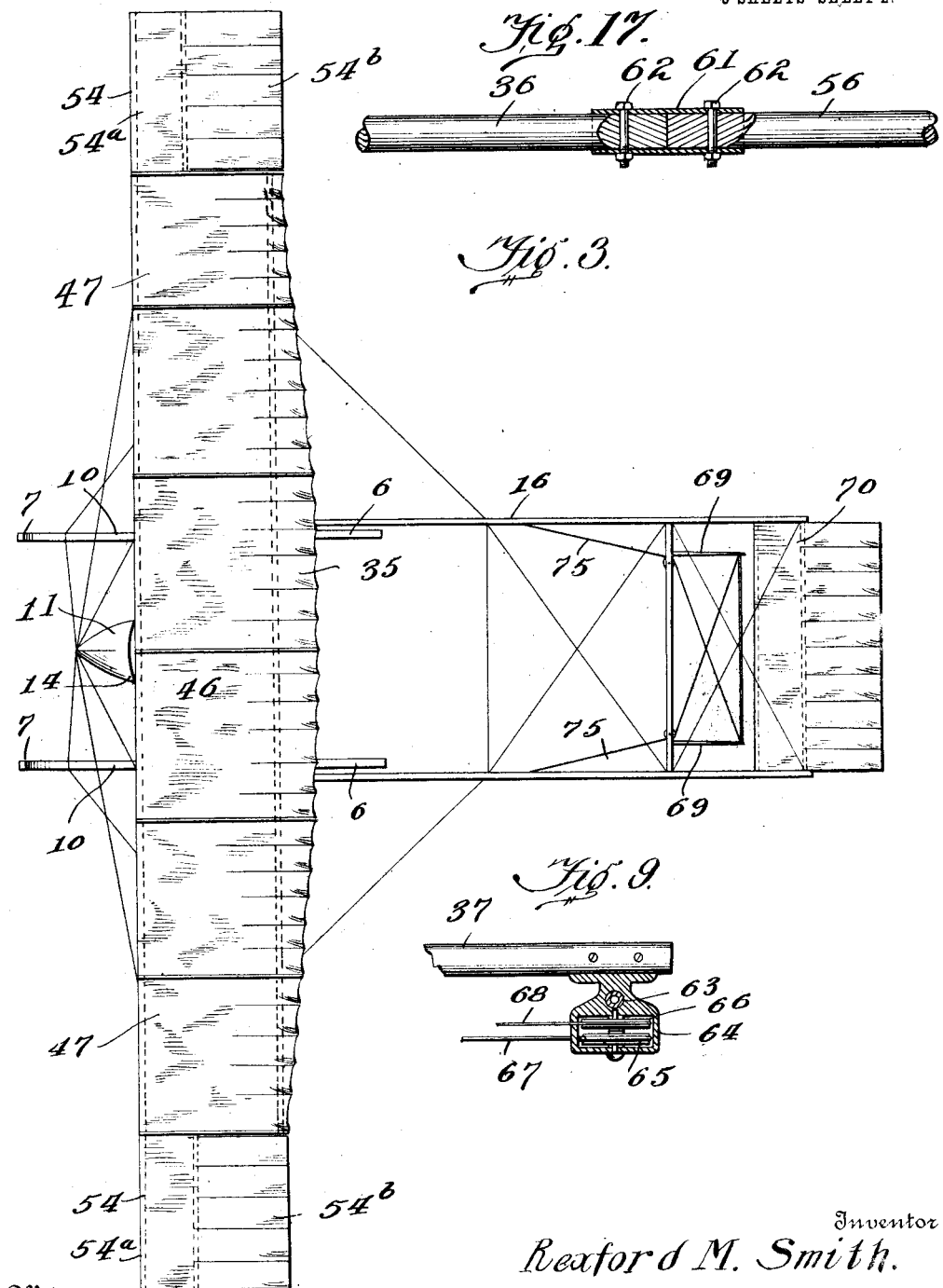

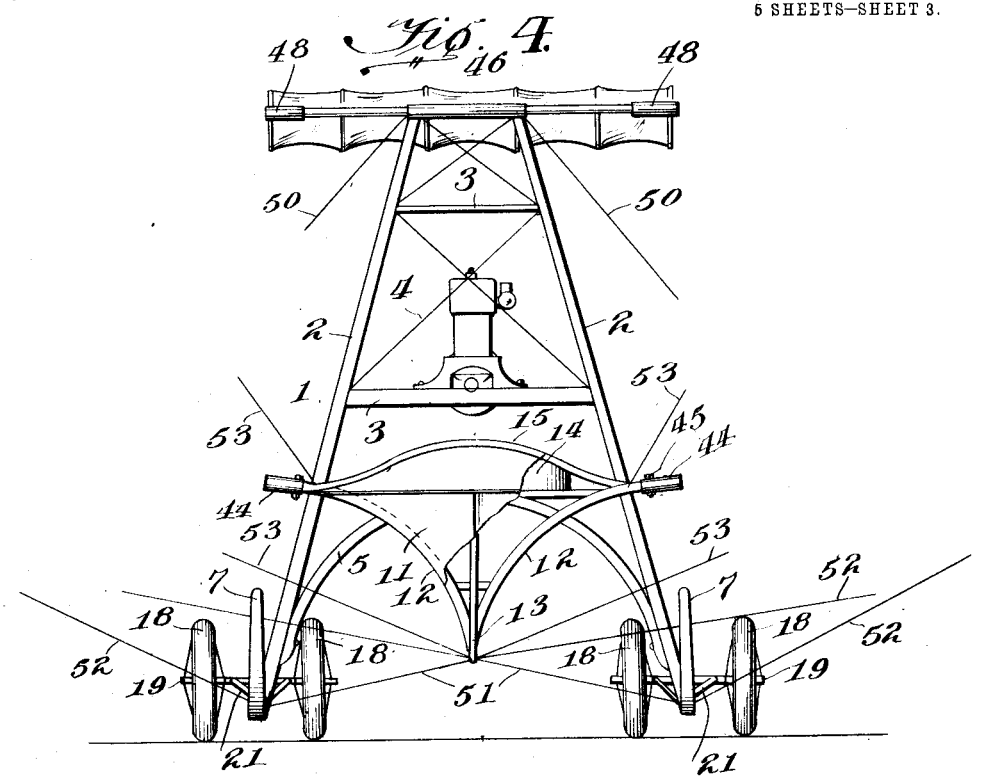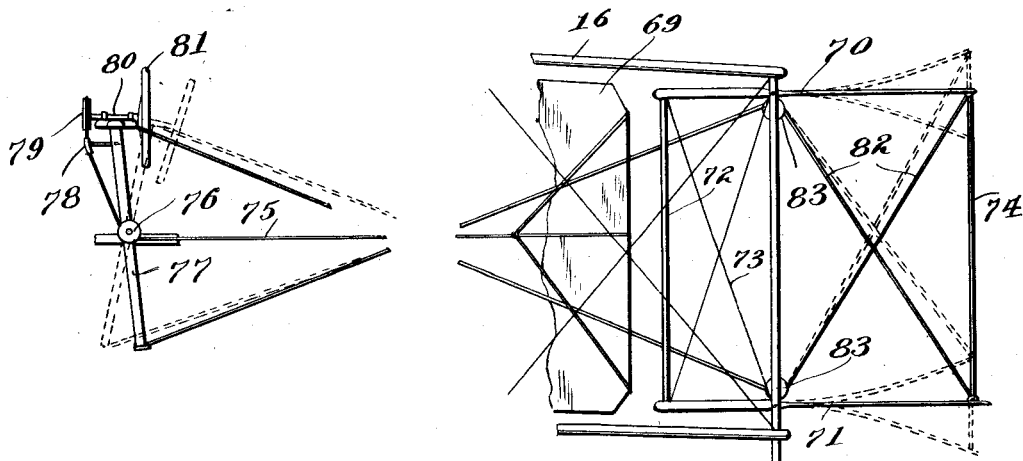

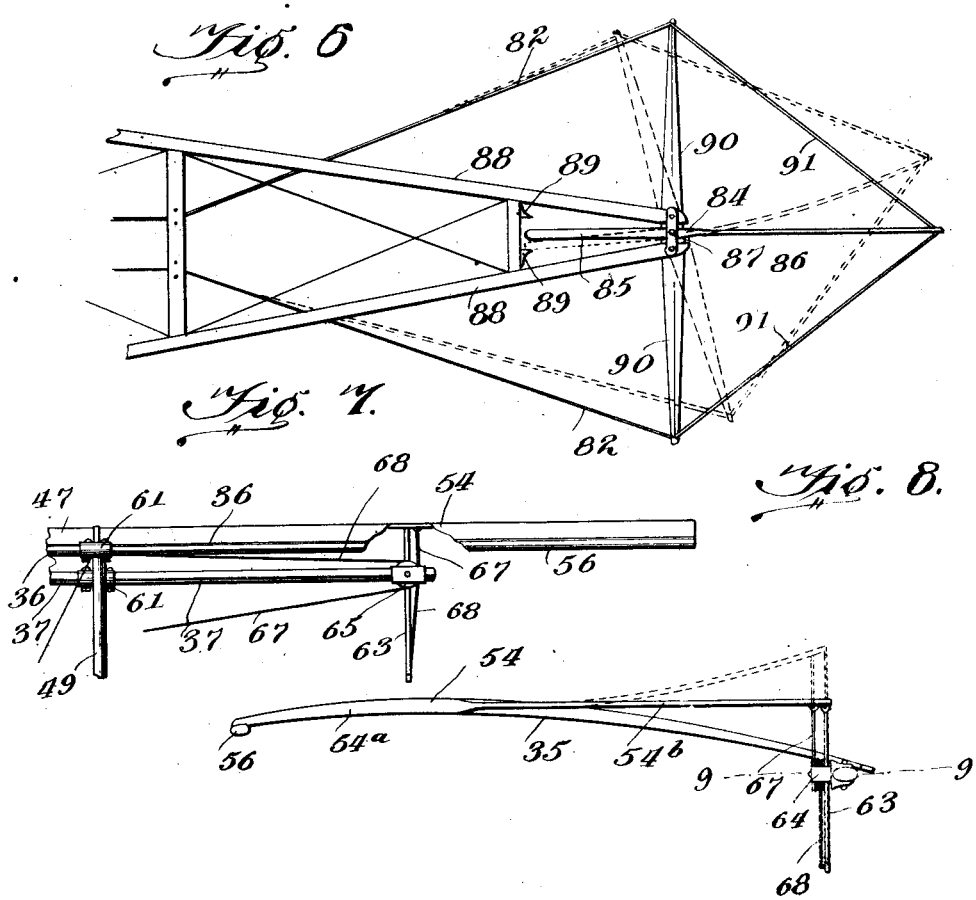

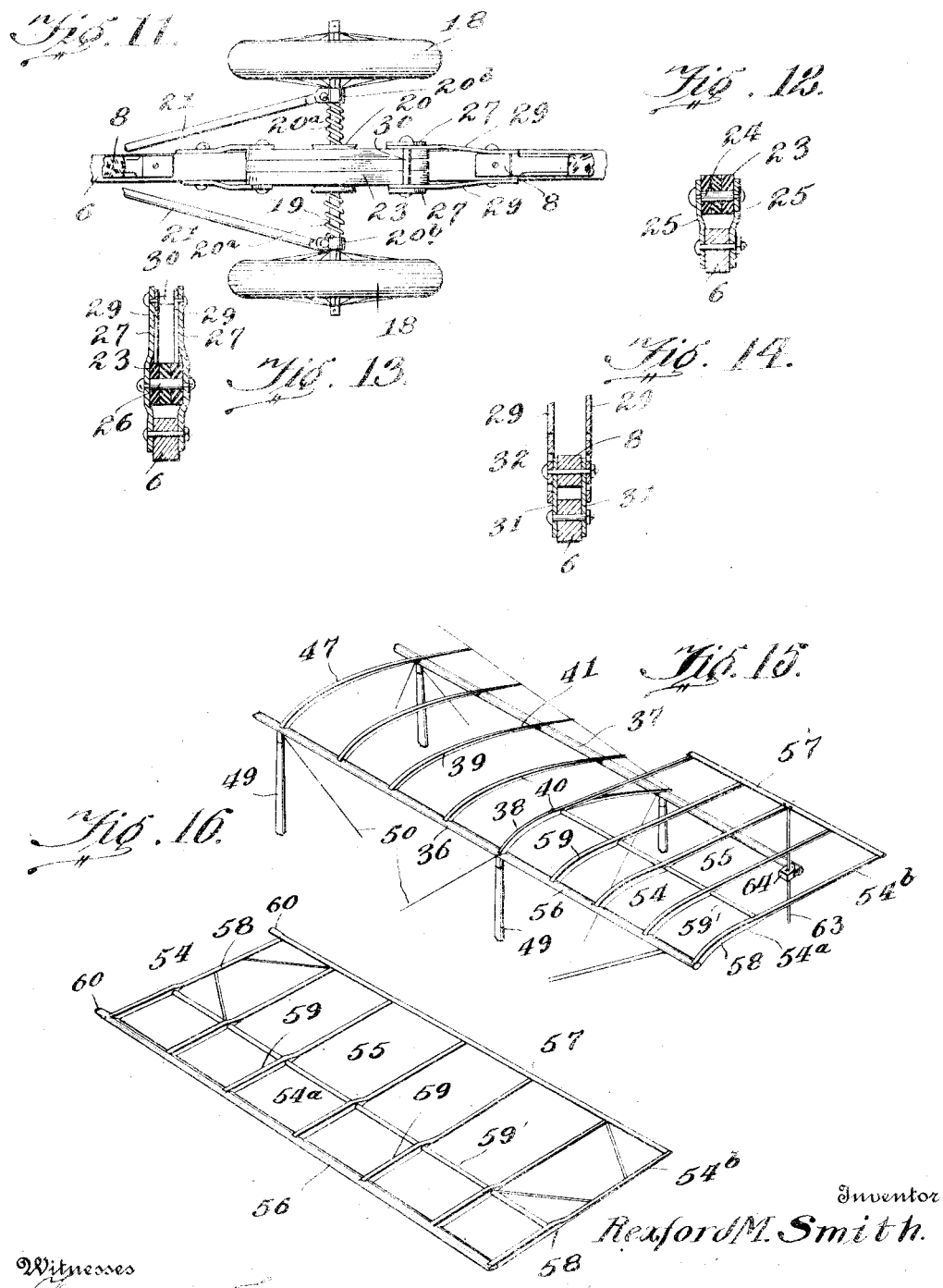

REXFORD M. SMITH, OF WASHINGTON, DISTRICT OF COLUMBIA, ASSIGNOR, BY MESNE ASSIGNMENTS, TO CONNECTICUT AIRCRAFT COMPANY, OF NEW HAVEN, CONNECTICUT, A CORPORATION.

FLYING-MACHINE.

1,128,378.  Specification of Letters Patent.  Patented Feb. 16, 1915.

Application filed March 11, 1911. Serial No. 613,874.

*To all whom it may concern:*

Be it known that I, REXFORD M. SMITH, a citizen of the United States, residing at Washington, in the District of Columbia, have invented new and useful Improvements in Flying-Machines, of which the following is a specification.

This invention relates to flying machines of the aeroplane or heavier-than-air type, the main object of the invention being to provide a machine of this character which possesses a high degree of inherent lateral and longitudinal stability and operates automatically to maintain to a large extent its poise or balance while in flight or in the act of landing after a flight, which will therefore have a desirable steadiness of motion in flight and during landing descents so as to decrease the amount of strain upon the machine and enable landings to be easily and safely made, and which further embodies means giving greater ease and sensitiveness of manual control in its various steering and balancing operations.

A further object of the invention is to provide a machine which may be readily and conveniently set up for use and taken down for storage or transportation; to provide a novel construction of wing surfaces and ailerons whereby the machine may be sensitively balanced in a lateral direction and banked in making turns; to provide a simple, strong and durable frame structure which combines maximum rigidity with a minimum amount of weight and material; to provide a simple, reliable and effective type of launching and landing gear including yieldingly supported wheels and means whereby the extent of yielding motion thereof may be regulated as occasion requires; and to provide a novel type of horizontal rudder whereby increased efficiency of action in maintaining the longitudinal balance of the machine and steering the same vertically is obtained.

With these and other objects in view, the invention consists of the features of construction, combination and arrangement of parts, hereinafter fully described and claimed, reference being had to the accompanying drawings, in which—

Figure 1 is a side elevation of a flying machine embodying my invention. Fig. 2 is a front elevation of the machine. Fig. 3 is a top plan view of the same. Fig. 4 is a front elevation of the main central frame or fuselage and chassis or carriage. Fig. 5 is a diagrammatic side elevation of the horizontal and vertical rudders and the means for controlling the same. Fig. 6 is a view in side elevation, showing a modified construction of rudder plane adapted for use as either an aileron or horizontal rudder. Fig. 7 is a view in front elevation of the outer end of one of the main plane wings and the means for flexing the associated aileron. Fig. 8 is an end elevation of the same. Fig. 9 is a detail section on the line 9—9 of Fig. 8. Fig. 10 is a detail sectional side elevation of one of the skids and one of the sets of supporting wheels. Fig. 11 is a top plan view of the same. Figs. 12, 13 and 14 are detail sections on the lines 12—12, 13—13 and 14—14 of Fig. 10. Fig. 15 is a perspective view of a portion of the frame of one of the main planes. Fig. 16 is a perspective view of the frame of one of the rudder planes. Fig. 17 is a detail section, showing one of the socket and tenon joint connections.

In the illustrated embodiment, showing the application of the invention to a headless biplane machine, 1 designates a central main frame or fuselage forming the supporting structure proper of the machine and including in its organization the chassis or carriage and the car or platform serving as the vehicle for the pilot or aviator, the passengers or freight, if any, and the various controlling devices. This frame or fuselage is preferably of frustopyramidal form and comprises front and rear pairs of upwardly converging corner posts 2 connected and braced by suitable cross pieces 3 and truss wires 4, the lower or diverging ends of each pair of posts being connected, if desired, by an arched brace 5, whereby great strength and durability is secured.

To the lower ends of the posts 2 are bolted or otherwise secured skids or runners 6 which project in front and rear of the frame and are preferably provided with upturned front ends 7. These skids are reinforced from the corner posts by braces 8 and the front ends thereof carry vertical fins 9 which are secured thereto and to the front posts and to braces 10 connecting the forward ends of the skids with said front posts. These fins operate as vertical surfaces to prevent lateral deflection of the machine from its proper line of travel under the pressures of gusts of air upon the tail frame and vertical rudder. Arranged in the space between the lower ends of the posts is a car 11 extending longitudinally in the line of flight and within which are arranged the seats for the pilot and passengers and the controlling devices, hereinafter described. This car is substantially boat-shaped and has the side walls 12 of its body or hull converging at their lower ends to form a keel 13 and thence curving upwardly and outwardly toward the sides of the frame. At its top the car is provided with a gunwale 14 forming a wind shield as well as a cockpit through which the head of the pilot projects, the bow and stern portions of the car being reinforced by arched braces 15 which connect with the upper edges of the walls 12 and the post 2 and operate in conjunction with the braces 5 to firmly support the car in position.

A tail frame 16 of suitable form is fixed to the main frame or fuselage 1 and is provided with a trail runner or its equivalent 17 which supports the weight of the tail frame when the machine is at rest and protects the same from shocks and jars in landing. This runner in conjunction with the skids or runners 6 and cushioned wheels 18 mounted on the latter provide a preferred type of launching and landing gear. The wheels 18 are arranged in pairs on opposite sides of the respective skids 6 at a point about in line with the center of gravity of the machine when in a flying attitude, each pair of wheels being journaled upon an axle 19 extending across the skid and carrying a grooved pulley or spool 20 which normally rests upon the skid and holds the axle from relative transverse movement. The spool is held centered and from longitudinal movement on the axle by coiled springs 20$^a$ surrounding the axle between said spool and clips 20$^b$ fixed to the axle. Each axle is carried by a fork 21 secured to the clips and pivoted to the adjacent front post 2, as at 22, for swinging movement in a vertical plane and is normally held in engagement with the skid by a resilient backing or shock absorber preferably composed of one or more rubber bands 23 extending longitudinally above the skid and bearing intermediately upon the spool 20. A pin or bolt 24 engages the front bights of the bands and fastens the same to a holding bracket composed of a pair of spaced plates 25 fixed to the skid, and a similar pin or bolt 26 passes through the rear bights of the bands and connects the same with a rear holding bracket 27 composed of a pair of spaced plates pivotally connected at their lower ends with the skid, as at 28. Brace plates 29 are pivotally connected at their upper forward ends with the upper ends of the bracket plates 27 by a pin or bolt 30 and have their lower rear ends arranged to straddle the adjacent rear brace 8 and adjacent brace irons 31 and are formed with a plurality of perforations 32 for the passage of a bolt 33 adjustably connecting said brace plates with the braces 8 and irons 31. By this construction a suitable implement or draft device may be connected with the bracket 27 to draw the latter rearwardly, whereby said bracket will operate as a lever to extend and tension the bands 30 to any suitable degree, so that their resistance to the upward movement of the wheels may be regulated. By this means the shock absorbing action of the wheels may be controlled to a nicety and the backing tensioned to adapt the wheels to effectually support the weight of the machine, which may vary under different conditions of service.

The main planes or supporting surfaces 34 and 35 may have any desired fore and aft curvature, and each is preferably constructed of two or more frame sections, to which are laced or otherwise suitably secured sections of a covering fabric. The frame of each plane section comprises front and rear longitudinal frame beams 36 and 37 connected by end pieces 38 and ribs 39, each rib and end piece being of maximum thickness from the front edge of the plane to a point substantially coincident with the highest point of curvature of the plane, as indicated at 40, and thence gradually tapered toward their rear ends, as indicated at 41. By this construction the front portion of each plane is rendered rigid and inflexible, while the rear portion thereof gradually increases in flexibility toward the rear edge of the plane, the rear portion of each plane thus being adapted to yield or flex to simulate the air-shedding action of the wing feathers of a bird, whereby longitudinal stability is promoted and the undue retention of air beneath the plane prevented. As shown, the lower plane 34 is composed of two demountable wing sections 42 and 43, which preferably incline at a dihedral angle and have the inner ends of their longitudinal frame bars formed to fit within sockets 44 fixed on the central main frame 1, preferably at the points of junction of the post 2 with the side walls of the car 11 and the braces 15, whereby the parts are coupled to reinforce each other. By this construction the wing sections have a slip joint connection with the main frame so that they may be applied by a relative sliding movement at right angles to the direction of length of the machine, bolts or other suitable fastenings 45 being employed to couple the parts together. Hence, the wing sections may be conveniently applied in assembling the machine and as conveniently detached for storage or transportation. When thus fitted in position the wings will be rigidly supported against movement at the joints and liability of collapse under air pressure.

The upper plane 35 is preferably formed of a stationary central section 46 fixed to the fuselage or main frame and wing sections 47, the longitudinal frame bars of said central section being provided with sockets 48 to receive the inner ends of the longitudinal frame bars of the wing section, whereby the wings of the upper plane are also rendered conveniently demountable by slip joint connections. The wings of the two planes are connected at intervals around their margins by the usual stanchions 49 and wire trusses 50, which stanchions and trusses are connected in any suitable manner with the wing frames to admit of the ready assemblage and disassemblage of the parts. Truss wires 51 and 52 are also arranged between the keel of the car and skids 6 and the wing sections of the lower plane, and truss wires 53 extend from the body of the car to the wing sections of the upper plane, whereby both planes are firmly fastened to the fuselage or central frame and the wing sections thereof braced and held from any possibility of casual disconnection. The upper plane is provided with marginal or end extensions 54 which extend beyond the lateral margins of the lower plane and thus increase the spread of the upper plane with respect to the lower plane. By the provision of these marginal extensions 54 and the arrangement of the wings of the lower plane at a dihedral angle the supporting surfaces themselves tend to correct lateral oscillations of the machine and to restore the lateral balance if disturbed, thus giving the machine an efficient amount of inherent lateral stability.

For the purpose of manually controlling the lateral balance and banking the machine in making turns, I construct the marginal extensions 54 in the form of ailerons or stabilizers, each comprising a frame 55 made up of front and rear bars 56 and 57, side bars 58 and ribs 59 over which is stretched a suitable fabric covering. The frame of the aileron is formed to provide tenons or projections 60 which enter sockets 61 on the frames of the upper plane wings and are secured thereto by bolts 62, whereby the ailerons may be conveniently applied and detached. The ribs and side bars of the ailerons have fixed front portions reinforced by a stay rod 59' and tapering or reduced rear portions making the front portion 54ª of each aileron rigid or inflexible and the rear portion 54ᵇ thereof flexible in a vertical plane, said rigid portions of the ailerons being reinforced from the lower plane wings by braces 54'. Each aileron is curved at its front portion to conform to the curvature of the front portion of the main plane between the meeting edge of the plane and its highest point of curvature, or the point of greatest depth of its chord, thus forming a lifting surface to coöperate with the plane, and from this point the flexible portion of the aileron extends horizontally so as to occupy a normal level above the level of the rear portion of the plane, in which position the flexible portion of the aileron lies at a neutral (or zero) angle of incidence or lesser angle of incidence than the rear portion of the supporting surface and offers the least resistance to the action of the air. The flexible portion of each aileron may be bent downwardly on an arc of curvature to an increased angle of incidence in which it increases the area of the supporting surface at the adjacent margin of the plane for an uplifting effect, or it may be bent upwardly to a like degree to reduce the area of the supporting surface for a depressing effect upon the adjacent margin of the plane. Connected with the rear edge of the flexible portion of each aileron is a vertically sliding rod or link 63 movable in a guide bracket 64 secured to the rear frame bar of the adjacent wing frame, in which bracket are journaled guide pulleys 65 and 66 over which pass controlling wires or cables 67 and 68 connected respectively at their adjacent ends to the flexible portion of the aileron and lower end of the rod. These cords or cables lead over suitable guides to a controlling device, not shown, on the car whereby the flexible portions of the two ailerons may be simultaneously flexed in opposite directions. It will be apparent that this construction of the ailerons enables a very sensitive degree of control to be obtained without any material increase in the head resistance, particularly in banking operations.

Mounted upon the tail frame is a laterally swinging vertical rudder 69 and in rear thereof is arranged a horizontal rudder preferably consisting of two superposed planes 70 and 71, each formed of a frame and a fabric covering. The frames of these rudder planes are constructed like the frames of the wings of the main plane and the aileron planes, that is to say, have rigid or inflexible front portions and flexible rear portions. The rigid portions of said rudder planes are stayed by connecting braces 72 and truss wires 73 and are suitably fixed to the tail frame, as at 74, while their flexible portions are free for movement in a vertical plane and are coupled by link stays 74' for movement in unison. Control cords or wires 75 lead from the vertical rudder 69 to the car and pass over guide pulleys 76 journaled on a post or stem 77 pivotally mounted on the car to swing in a fore and aft direction, and the terminals of said cords or wires pass through guides 78 and are wound in opposite directions around a drum or pulley 79 carried by a shaft 80 to which is connected a steering wheel 81, whereby the drum may be turned in either direction to swing the rudder. Other controlling cords or wires 82 pass over guide pulleys 83 on the tail frame and are crossed and connected at their rear ends with the flexible portions of the horizontal rudder planes. These cords or wires 82 thence extend forwardly to the car and are crossed and respectively connected with the upper and lower ends of the swinging post 77, so that when said post is swung forwardly or rearwardly by means of the hand wheel 81 the rudder planes may be simultaneously flexed upward or downward to steer the machine in a vertical plane.

In Fig. 6, I have shown a modified form of horizontal rudder which may be employed, if desired, as an aileron between the lateral margins of the planes, in which form the rudder consists of a single plane 84 having a rigid front portion 85 and a flexible rear portion 86, the frame of this rudder plane being of the same general construction as the frames of the main plane wings and ailerons hereinbefore described. The plane 84 is pivotally mounted to swing on horizontal axes 87 on converging bars 88 of the tail frame, between which bars the portion 85 of the rudder extends and is movable to an extent limited by upper and lower stop devices 89. Lever arms 90 are pivotally mounted on the frame and are connected with the controlling wires 82 and further connected with the rear edge of the flexible portion 86 of the rudder plane by wires or connections 91. By this construction motion may be transmitted to the rudder plane to flex the flexible portion 86 to any degree desired either upward or downward, as well as to swing the plane bodily on its axis. It will be understood that in the movement of the plane in either direction, the portion 86 will first be flexed slightly and the plane then tilted through the pull thereon to the extent limited by the coacting stop 89, after which a continued pull will result in the portion 82 being flexed to a greater degree. By this construction a very sensitive type of rudder is provided in which the steering movement may be graded to a fine degree by simple flexion or to sharp degrees by combined swinging and flexing movements, the advantages of which under varying conditions of service will be apparent.

In practice, the driving propeller 92 may be arranged either at the front or rear of the machine, and the motor 93 may be either mounted upon the car, as inferentially indicated in Fig. 2, or at a suitable elevation upon the central main frame or fuselage 2. In either arrangement the weight of the motor, car and freight or passengers will be directly sustained by the main central frame, skids and supporting wheels and removed from the planes, so that all shocks and jars in landing, etc., will be partially taken up by the shock absorbers and partially transmitted to the main frame, preventing the transmission of strain to the wing frames.

It will be observed that from the construction described that the shock absorbers may be tensioned to any degree required under different contingencies of service, according to the varying weight of the machine under different conditions, and nature of the surface of the ground in the region in which flights are made, while provision is also made for sensitive manual control of the machine and an inherent degree of automatic balancing action rendering the machine steady in flight. By the sectional construction of the frame and described mode of connecting the parts thereof, the machine may be readily, quickly and conveniently set up for use or taken down for storage or transportation. It will also be observed that the car 11 in addition to serving as a stability fin to prevent skidding, forms a part of the lower supporting surface, as the walls 12 constitute inclined continuations of the inner ends of the wings 42 and 43.

It will be understood that the term "steering plane" as employed in the appended claims contemplates and includes ailerons, rudders and other controlling planes, however mounted or arranged, except when specifically defined in the claims.

Having thus described the invention, I claim:—

1. In a flying machine, a steering plane having a curved rigid front portion, and a straight flexible rear portion arranged in the horizontal plane of the deepest portion of the curve of said rigid front portion, and means for flexing said flexible rear portion perpendicularly to and in either direction, beyond the plane of said rigid front portion.

2. In a flying machine, a steering plane having a curved rigid front portion and a straight flexible rear portion fixedly connected therewith, said flexible rear portion being arranged in the horizontal plane of the deepest portion of the curve of said rigid curved portion and constituting a relatively thinner continuation of said rigid curved portion, and means for flexing said flexible portion perpendicularly to and in either direction beyond the plane of said rigid front portion.

3. In a flying machine, a supporting surface curved in a fore and aft direction and provided at its extremities with steering planes, each curved in conformity with and in line with the plane of said supporting surface in advance of its camber line, and each provided with a straight, flexible rear portion disposed horizontally above the plane of the supporting surface in rear of its camber line and at a neutral angle relative to the angle of incidence of said supporting surface and means for flexing said flexible portions of the lateral extremities of the supporting surface perpendicularly to the plane of said surface.

4. In a biplane flying machine, an upper supporting plane having its ends extending beyond the ends of the lower supporting plane, each of said extended ends of the upper supporting plane embodying a rigid front portion forming a part of said upper plane and having a corresponding positive angle of incidence and a straight flexible rear portion lying horizontally above the plane of said supporting plane rear of its camber line and having a neutral angle of incidence, said flexible portions of the extended ends of the upper supporting plane being adjustable upwardly or downwardly from their normal positions, and means for so adjusting said flexible portions of the plane extensions.

5. In a flying machine, a horizontal steering plane having a curved rigid front portion and a flexible rear portion, said flexible rear portion being straight and arranged in the horizontal plane of the crest of the rigid curved portion, and being bodily flexible upwardly or downwardly from its normal plane, and means for so flexing said flexible portion.

6. In a flying machine, a swinging steering plane having a fixed, rigid front portion and a flexible rear portion, said flexible rear portion being continuous with said rigid front portion, and a single controlling means directly connected with said flexible portion for both swinging the plane in a predetermined arc and then flexing its flexible portion.

7. In a flying machine, a swinging steering plane having a rigid, comparatively thick inflexible front portion and a flexible relatively attenuated rear portion, said portions being rigidly united, and adjusting means directly connected with said flexible portion for both swinging the plane in a predetermined arc and then flexing said flexible portion on an arc of greater degree than its arc of body movement.

8. In a flying machine, a pivotally mounted steering plane having a rigid front portion and a flexible rear portion, means for swinging the plane, and flexing its flexible portion, and means for limiting the swinging movement of the plane to a degree less than the amplitude of flexibility of said flexible portion.

9. In a flying machine, a pivotally mounted steering plane having a rigid front portion and a flexible rear portion, stops for limiting the pivotal motion of said plane, and a controlling means operative to both swing the plane and flex the flexible portion thereof, for flexing said flexible portion beyond the plane of the pivotal movement of said steering plane.

10. In a flying machine, a supporting surface curved between its front and rear edges, ailerons at the ends of said supporting surface having rigid front portions forming a part of said supporting surface and curved to conform thereto and flexible rear portions extending horizontally above the plane of the rear portion of the supporting surface, and means for flexing said flexible portions of the ailerons perpendicularly to the plane of the supporting surface.

11. In a flying machine, a supporting surface curved between its front and rear edges, ailerons at the ends of said supporting surface having rigid front portions forming a part of said supporting surface and curved to conform thereto and flexible rear portions extending horizontally above the plane of the rear portion of the supporting surface, a link depending from the flexible portion of each aileron, a downwardly flexing connection attached to the flexible portion of the aileron, and an upwardly flexing connection for imparting upward motion to the link.

12. In a flying machine, a pivotally mounted steering plane, rigid in advance and flexible in rear of its pivotal axis, means coacting with the rigid portion of said plane for limiting the pivotal motion thereof, and means for swinging said plane on its pivot and then flexing its flexible portion.

13. In a flying machine, a lower plane, a curved upper plane having its lateral margins extending beyond the lateral margins of the lower plane, said lateral margins of the upper plane including rigid front portions curved to conform to and lying in the plane of the body of said upper plane and flexible rear portions projecting horizontally above the level of the rear portion of the upper plane, and means for flexing said flexible portions.

14. In a flying machine, a supporting plane curved downwardly and rearwardly between its fore and aft edges, ailerons at the ends of said plane, each having a rigid portion curved to conform to and extending between the fore edge and the highest point of curvature of said plane and a normally straight flexible portion extending horizontally above the level of the plane in rear of said point of highest curvature, and means for bending or flexing the flexible portions of said ailerons either upward or downward.

15. In a flying machine, a supporting surface curved in a fore-and-aft direction, steering planes at the lateral extremities of said supporting surface, said planes having curved rigid front portions curved to conform to the curvature of the supporting surface in advance of its camber line, and straight, relatively attenuated flexible rear portions extending horizontally above the plane of the supporting surface in rear of its camber line, and means for flexing said flexible portion of the steering planes either upwardly or downwardly.

16. In a flying machine, a central frame, a boat-shaped car mounted on said frame and having sides sloping to form a keel and diverging on curved lines upwardly and outwardly therefrom, a lower plane formed of wings supported by said frame and inclining dihedrally from the upper edges of said sloping sides, an upper plane supported by the frame and having lateral marginal portions extending beyond the lateral margins of the lower plane, and means for flexing portions of said lateral marginal extensions of said upper plane.

17. In a flying machine, a main frame, a car mounted thereon, receiving sockets at the intersection of the car and main frame, a lower supporting surface comprising wings having tongues to engage said sockets, an upper supporting surface comprising a central section fixed to the main frame and provided with receiving sockets and wing sections having tongues engaging said sockets, the said wing sections of the supporting surfaces being connectible with and disconnectible from said sockets by relative movements in the direction of length of the supporting surfaces, and stays for bracing said wing sections from the main frame and holding the parts normally assembled.

18. In a flying machine, a supporting surface, ailerons at the ends of said supporting surfaces having rigid front portions forming a part of said supporting surface and lying in the plane thereof and flexible rear portions extending horizontally above the plane of the supporting surface, and means for flexing said flexible portions of the ailerons perpendicularly to the plane of the supporting surface.

19. In a flying machine, a curved supporting surface having lateral steering planes provided with rigid front portions lying in the plane of said surface and curved to conform thereto between its leading edge and camber line, and provided with substantially straight flexible rear portions normally disposed above the plane of said surface, and means for flexing said flexible portions of the steering planes either upward or downward.

20. In a flying machine, a supporting plane or surface provided with steering planes at its lateral margins, said steering planes being substantially coextensive in depth with said lateral margins of the supporting plane or surface, and having rigid front portions lying substantially in the plane of said supporting plane or surface and flexible rear portions lying out of the plane of said surface, and means for warping the flexible portions of the ailerons or steering planes either upward or downward from their normal position.

21. In a flying machine, a central frame, a boat-shaped car mounted on said frame and having sides sloping to form a keel and diverging on curved lines upwardly and outwardly therefrom, a lower plane formed of wings supported by said frame and extending from the upper edges of said sloping sides, an upper plane supported by the frame and having lateral marginal portions extending beyond the lateral margins of the lower plane, and means for flexing the flexible portions of said lateral marginal extensions of said upper plane.

22. In a flying machine, a main frame and chassis of substantially frusto-triangular or pyramidal form, a car supported by the lower portion of said frame, an upper plane composed of a central section fixed to the main frame and wing sections provided with tongue and socket connections, and a lower plane composed of wing sections having tongue and socket connections with the main frame, the sections of the planes being movable in the direction of length of the planes for coupling and uncoupling action, and stays connecting the parts for holding them normally assembled.

In testimony whereof I affix my signature in presence of two witnesses.

REXFORD M. SMITH.

Witnesses:
C. C. HINES,
BENNETT S. JONES.